F. G. HAWKSWORTH AND J. H. EKLOF.
TECHNICAL ANATOMICAL DENTAL MODEL.
APPLICATION FILED NOV. 21, 1918.
1,387,540.  Patented Aug. 16, 1921.
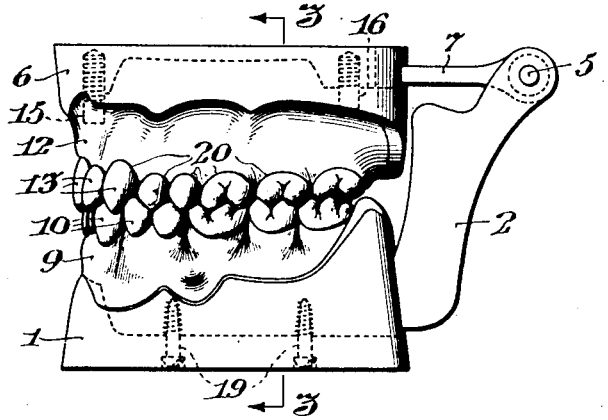
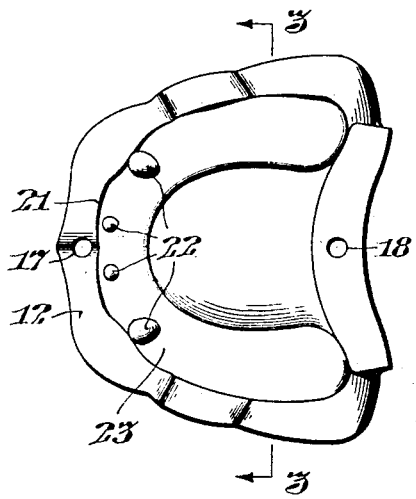
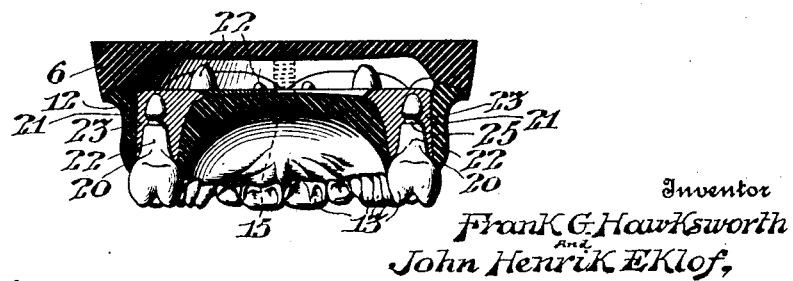

UNITED STATES PATENT OFFICE.

FRANK G. HAWKSWORTH, OF WESTMONT, NEW JERSEY, AND JOHN HENRIK EKLOF, OF LANSDOWNE, PENNSYLVANIA, ASSIGNORS TO THE S. S. WHITE DENTAL MANUFACTURING COMPANY, OF PHILADELPHIA, PENNSYLVANIA, A CORPORATION OF PENNSYLVANIA.

TECHNICAL ANATOMICAL DENTAL MODEL.

1,387,540.  Specification of Letters Patent.  Patented Aug. 16, 1921.

Application filed November 21, 1918. Serial No. 263,553.

*To all whom it may concern:*

Be it known that we, FRANK G. HAWKSWORTH, a citizen of the United States, and a resident of Westmont, in the county of Camden, State of New Jersey, and JOHN HENRIK EKLOF, a subject of the King of Sweden, and a resident of Lansdowne, in the county of Delaware, State of Pennsylvania, have invented certain new and useful Improvements in Technical Anatomical Dental Models, of which the following is a specification, reference being had to the accompanying drawing.

Our invention relates to that class of devices that provide means for holding artificial teeth in such natural relation as to permit technical or experimental work to be performed thereon.

The principal objects of our invention are to provide a jaw model having dentures provided with suitable apertures for the loose reception of artificial teeth, and to provide means whereby said teeth may be so yieldingly retained in said apertures as to closely simulate the natural retention of teeth in the human jaw.

Other objects of our invention are to provide a jaw model so constructed and arranged that the tooth retaining medium may be readily introduced to retain the teeth, and removed to release said teeth, and that said tooth retaining medium may be introduced and removed from the inner face of the tooth holding denture.

Specifically stated, the form of our invention as hereinafter described, comprehends a denture formed of suitable material having one face and its perimeter conforming generally to the human mouth and gums, and provided with tooth receiving apertures, and having in the other face a recess, groove or channel communicating with said apertures and arranged to receive yielding material for so yieldingly engaging the root ends of the teeth that may be inserted in the tooth receiving apertures as to permit their relative gyration.

Our invention also includes all of the various novel features of construction and arrangement as hereinafter more definitely specified.

In the accompanying drawings, Figure 1 is a side elevational view of the jaw model constructed in accordance with our invention, comprising the superior maxilla member hinged to the inferior maxilla or mandible member, and respectively carrying the upper and lower dentures in antagonized relation; Fig. 2 is a plan view of the upper denture *per se;* and Fig. 3 is a transverse vertical sectional view taken through the upper denture and superior maxilla member on the lines 3—3 in Figs. 1 and 2.

In said figures, the model comprises the mandible or inferior maxilla member 1, forming the base and preferably formed of rubber, celluloid, metal or other suitable material, and having rearwardly extending and upwardly projecting arms 2, simulating the ascending ramus, and having in their free ends the pintles 5, hingedly carrying the superior maxilla member 6 which is formed similar to the inferior maxilla member 1 and which has the arms 7 hingedly supported by the pintles 5, and so arranged as to permit the jaw members, respectively corresponding to the superior maxilla and inferior maxilla, to hinge upon the pintle axis corresponding substantially to the condyle and to be opened and closed as desired.

The respective jaw members carry the lower denture 9 having the teeth 10, and the upper denture 12 having the teeth 13. Said dentures may be variously engaged with their respective jaw members, and for convenience of illustration, the upper jaw member is provided with depending studs 15 and 16 arranged to enter the corresponding apertures 17 and 18 in the denture 1, to hold said denture in position, and the lower denture 9 is engaged with the mandible member 1 by the screws 19, as shown in dotted lines in Fig. 1.

As the teeth are similarly retained in the respective dentures, we have chosen to describe and illustrate in detail the upper denture 12, which is provided with a series of apertures 20 conforming to the dental arch, and arranged to receive teeth 13 as shown in Figs. 1 and 3. The teeth employed may be preferably composed of a material that may be drilled or otherwise operated upon.

The apertures 20 open into the groove or channel 21 in the inner surface of the denture, into which the root ends 22 of the teeth 13 extend, and in which any suitable plastic material, such, for instance, as a composition of rubber or other yielding substance 23, may be poured or otherwise introduced to surround said root ends, and thereby yieldingly hold the teeth in their respective apertures, so as to be relatively separated, filled, alined, extracted, or otherwise operated upon.

The teeth may be prevented from axial displacement by providing the root portion with a groove or indentation 25 into which the yielding substance 23 projects to form a retaining bead, as shown in Fig. 3. The tooth root may as well be provided with a bead instead of the groove, as is obvious.

Our invention is advantageous in that the yielding substance which retains the teeth in their respective apertures may be introduced from the inner face of the denture so as not to be visible from the outer or gum surface. Moreover, by reason of the groove or channel 21 flaring inwardly, as shown in Fig. 3, the tooth retaining medium may be easily introduced and readily removed.

We do not desire to limit our invention to the precise details of construction and arrangement as herein set forth, as it is obvious that various modifications may be made therein without departing from the essential features of our invention as defined in the appended claims.

Having thus described our invention, we claim:

1. A device of the class described, comprising a denture having tooth receiving apertures extended therethrough, teeth loosely fitted in said apertures with their root ends projecting through the inner face of said denture, and yielding material on said inner face engaging said teeth in said apertures for permitting their relative gyration.

2. A device of the class described, comprising a denture having teeth loosely fitted in suitably disposed apertures therein, and having yielding material upon the inner face of said denture, engaging the root ends of said teeth and permitting their relative gyration.

In witness whereof we have hereunto set our hands the 20th day of November, A. D. 1918, and the 20th day of November, A. D. 1918, respectively.

FRANK G. HAWKSWORTH.
JOHN HENRIK EKLOF.

Witnesses:
WILLIAM J. RUSSELL,
CLIFTON C. HALLOWELL.